Patented Feb. 6, 1951

2,540,799

UNITED STATES PATENT OFFICE 2,540,799

DYESTUFF COMPOSITIONS COMPRISING ESTERIFIED VAT DYES AND BASIC PYRAZOLONES

John Taras, Alpha, N. J., assignor to General Aniline & Film Corporation, New York, N. Y., a corporation of Delaware No Drawing. Application May 27, 1948, Serial No. 29,651

6 Claims. (Cl. 8—70)

This invention relates to improved dyestuff compositions containing a salt of a polybasic acid ester of the leuco form of vat dyestuffs, and more especially, to such compositions for the printing of textile fibers. For simplicity in description, these dyestuff compounds are hereinafter referred to as "ester salts of leuco vat dyestuffs."

The ester salts of leuco vat dyestuffs useful in the compositions of the present invention can be prepared from various classes of vat dyestuffs (for example, indigoids, thioindigoids and vat dyestuffs containing the anthraquinone nucleus). They are commonly prepared as the sodium salt, although the salt of the other alkali metals or of ammonia or of an organic base can also be made. A particularly valuable class of these ester compounds are the acid sulfuric acid esters of the leuco vat dyestuffs. In the form of their alkali metal salts they can be prepared in a stable form.

These ester salts of leuco vat dyestuffs are not reoxidized to the parent dyestuffs on exposure to air and are relatively more soluble in water than the parent dyestuffs from which they are derived. They have a fair affinity for both animal and vegetable fibers. This affinity can be increased by the use of an exhausting agent and by raising the temperature at which the fiber is contacted with the ester salt.

The printing of textile material with ester salts of leuco vat dyestuffs is a well known art. It comprises generally dissolving the ester salt of the leuco vat dyestuff in water and adding a thickening agent to form the printing paste which is applied to the fiber in known ways, after which the insoluble parent vat dyestuff is fixed on the fibers by the hydrolysis and oxidation taking place in the so-called "acid-ageing" process. In the acid-ageing for the development of the print, acid steam is applied along with treatment of the impregnated fabric with an acid solution of an oxidizing agent. Where an acid-liberating agent and an oxidizing agent have been incorporated in the printing paste, development of the print takes place with the application of ordinary steam. The printed material is then rinsed, soaped and finished.

The solubility in water of the ester salts of the leuco vat dyestuffs is due to the presence in the molecule of one or more polybasic acid ester groups. This solubility varies widely and depends chiefly on the character of the parent vat dyestuff. It is an unpredictable quantity in view of the wide variations in the solubility in water of the parent dyestuffs of the several vat dyestuff classes (indigoid, thioindigoid, pyranthrone, dibenzanthrone, and the like). In the case of the sodium salts of the sulfuric acid esters of the leuco vat dyestuffs, some of these are easily soluble in water, whereas others, being considerably less soluble, are readily salted out by the presence in the printing paste of electrolytes usually employed in the printing, notably ammonium thiocyanate for the acid-liberating function, and sodium chlorate for the oxidation step. The selection of vat dyestuffs for use in the printing of textiles is accordingly limited to those, the leuco ester salts of which possess the required solubility in water.

In the interests of providing stable printing pastes containing a soluble salt of the sulfuric acid ester of leuco vat dyestuffs and of employing therein leuco ester salts of low solubility, thus to provide a wider range of selection in the vat dyestuffs, more work has been done by way of adding to the printing compositions various quantities of organic solvents such as alcohols, ethylene glycol and the like, and of other printing assistants of a variety of chemical species. Despite the many excellent printing assistants which have been added to the printing pastes, there are certain vat dyestuffs, for example, pyranthrone, which yield sulfuric acid ester salts which are so difficultly soluble in water that it is commercially impossible to use them for printing purposes.

According to my invention, improved dyestuff compositions containing salts of acid polybasic acid esters, especially acid sulfuric acid esters, of leuco vat dyestuffs, can be obtained by incorporating with the ester salt compound a basic pyrazolone compound. The pyrazolones as a class are weakly basic compounds and by the presence of substituent acid groups, such as the carboxylic and sulfonic acid groups, are converted to acid-reacting compounds. The use of acid-reacting pyrazolone compounds in the dyestuff compositions of the present invention is not contemplated. Accordingly, by the use herein and in the claims, of the term "basic" with reference to the pyrazolones, it is intended thereby to exclude the acid-reacting pyrazolone compounds from the dyestuff compositions contemplated by the present invention.

In addition to the advantages of improving the solubility of the less soluble ester salts of the leuco vat dyestuffs and the stability of the printing compositions by the use therewith of basic pyrazolone compounds, it is a further advantage of the invention that by the use of basic pyrazolone compounds in printing compositions containing the more soluble ester salts of leuco vat dyestuffs and from which commercially acceptable textile prints are obtained, that the quality of these prints may be improved, both in respect to tinctorial strength and brilliancy.

The basic pyrazolone compounds may be incorporated directly into the printing pastes or they may first be mixed with the ester salt of the leuco vat dyestuff. They may be used singly, or mixtures of the same may be added to the dyestuff compositions. The amount of the basic pyrazolone compound used may be varied considerably and the amount taken in any one case generally will depend upon the solubility of the ester salt of the leuco vat dyestuff and the activity of the particular basic pyrazolone employed. For example, if the salt of the acid sulfuric acid ester of the leuco vat dyestuff is already sufficiently water soluble, only a small amount of the basic pyrazolone is required and then only enough to improve the printing properties. In general, improved results may be obtained on the use of from about one-half to two parts by weight of the basic pyrazolone for each part of the parent vat dyestuff in the ester salt. Furthermore, an excess of the basic pyrazolone may be used, the excess merely acting as a diluent.

Among the basic pyrazolones which can be employed for the preparation of improved dyestuff compositions in accordance with my invention are, for example, 3-pyrazolone, 1-phenyl-3-pyrazolone, 1-phenyl-2-acetyl-3-pyrazolone, 1-phenyl - 5 - methyl - 3 - pyrazolone, 1-(4'-bromophenyl)-5-methyl-3-pyrazolone, 1 - phenyl - 2 - methyl-5-chlor-3-pyrazolone, 1-o-tolyl-5-methyl-3-pyrazolone, 5-pyrazolone, 3-methyl-5-pyrazolone, 4-methyl-5-pyrazolone, 1,3-dimethyl-5-pyrazolone, 1,2,3-trimethyl - 5 - pyrazolone, 1-phenyl-5-pyrazolone, 1-o-tolyl-5-pyrazolone, 1-o-tolyl-3-methyl-5-pyrazolone, 1-phenyl-2-methyl - 5 - pyrazolone, 1-phenyl-3-methyl-5-pyrazolone, 1-phenyl-2,3-dimethyl-5-pyrazolone, 1-phenyl - 2,3 - dimethyl-4-amino-5-pyrazolone, 1-phenyl-2,3-dimethyl-4-dimethyl-amino-5- pyrazolone, 1-(2'-nitrophenyl)-2,3-dimethyl-5-pyrazolone, 1-(3'-aminophenyl)-2,3-dimethyl-5-pyrazolone, 1-(3'-dimethylamino) - 2,3-dimethyl-5-pyrazolone, 1-(3'-acetaminophenyl)-2,3-dimethyl-5-pyrazolone, 1-p-tolyl-2,3-dimethyl-5-pyrazolone, 1-benzyl-2,3-dimethyl-5-pyrazolone, 1-phenyl-3-chloro-5-pyrazolone, 1-phenyl-2-ethyl-3-methyl-5-pyrazolone, and the like. A preferred class of the basic pyrazolones for use in preparing the dyestuff compositions of the invention are those containing the antipyrine nucleous, for example, antipyrine itself (1-phenyl-2,3-dimethyl-5-pyrazolone), amino-antipyrine (1-phenyl-2,3-dimethyl-4-amino-5-pyrazolone) and di-methylamino-antipyrine (1-phenyl-2,3-dimethyl-4-dimethylamino-5-pyrazolone).

The basic pyrazolone will not interfere with the other agents normally employed in formulating printing pastes containing salts of acid sulfuric acid esters of the leuco vat dyestuffs. Thus, in preparing printing pastes or powders with these vat dyestuff ester salts, the basic pyrazolone compound may be used to replace part of the water or the solid diluent in the standardization of the dyestuff composition. Additional substances having diluent, anti-foaming, wetting, catalytic or other desired action may be included in the dyestuff compositions of the present invention. Specific examples of such agents are sodium sulfate or sodium carbonate which serve as diluents or alkaline agents, organic fillers such as dextrose, dextrins and the like, and catalysts such as ammonium vanadate and the like.

The present invention is further illustrated by the following specific examples to which, however, it is not intended that it be limited. Parts are by weight.

*Example 1*

A. A powdered dyestuff composition is prepared by grinding together in the dry state, screening and milling:

100 parts of a dry dyestuff composition containing the sodium salt of the sulfuric acid ester of the leuco compound of the anthraquinone-acridine dyestuff of the formula:

(equivalent to 35.2 parts of the parent vat dyestuff)
26 parts of antipyrine, and
6 parts of sodium sulfate.

The final concentration of the parent vat dyestuff in the dry composition is 26.6%.

B. A powdered dyestuff composition is made up as in A with the exception that the antipyrine is omitted and 32 parts of the diluent sodium gluconate, is substituted therefor. The concentration of the parent vat dyestuff in the dry composition is the same (26.6%).

A printing paste is prepared from each of these dyestuff compositions, A and B, in the following manner:

4 parts each of the dyestuff compositions A and B is separately mixed with
4 parts $\beta,\beta'$-dihydroxy diethylsulfide
4 parts of urea and finally dissolved by adding
28 parts warm water and holding in a boiling water bath for 2 minutes.

The solutions are then each mixed with:

50 parts of starch-tragacanth thickening and
4 parts of a 35% sodium chlorate solution
2 parts 1% ammonium vanadate solution
2 parts 28% ammonia
2 parts 50% gluconic acid solution Cotton cloth is printed with a portion of each of the printing pastes as thus prepared. After drying, the printed cloth is subjected to a steam ageing process by exposing it for about 10 minutes to the action of steam. The development is completed after the cotton cloth is subjected to rinsing, soaping and finishing in the usual manner.

The printing paste prepared from the dyestuff composition A containing antipyrine yields an olive green shade. The print is stronger and more level than that produced with the printing paste made from the dyestuff composition B not containing the antipyrine. In the latter case the prints are weak and fail to develop fully.

Example 2

A. A powder made up for cotton printing containing antipyrine and the disodium salt of the acid sulfuric acid ester of the leuco compound of 2,1-naphthioindigo is prepared by intimately mixing in the dry form by grinding together:

100 parts of a dry dyestuff composition containing the disodium salt of the acid sulfuric acid ester of the leuco compound 2,1-naphthioindigo (equivalent to 43 parts of the parent 2,1-naphthioindigo) with
91 parts of antipyrine.

Thus the final concentration of the parent vat dyestuff in this dry composition is 22.5%.

B. A like dyestuff composition is made up as in A but without the antipyrine and containing as diluent, 91 parts of sodium gluconate.

A printing paste is prepared from each of the dyestuff compositions A and B in the following manner:

4 parts each of the dyestuff compositions A and B are separately mixed with
4 parts $\beta,\beta'$-dihydroxy diethylsulfide and
4 parts urea and finally dissolved by adding
27 parts of warm water and holding in a boiling water bath for 2 minutes.

The solutions are then each mixed with:

50 parts starch-tragacanth thickening and
4 parts 25% sodium chlorate solution
2 parts 1% ammonium vanadate solution
1 part 28% ammonia and
4 parts ammonium sulfocyanate.

Cotton cloth is printed with a portion of each of the printing pastes as thus prepared. After drying, the printed cloth is subjected to a steam ageing process by exposing it for about 10 minutes to the action of steam. The development is completed after the cloth is rinsed, soaped and finished in the usual manner.

The printing paste prepared from the dyestuff composition A containing antipyrine yields a rich brown shade which is stronger, brighter and more level than that produced with the printing paste made from the dyestuff composition B not containing the antipyrine. In the latter case the prints are mottled, very weak and fail to develop fully.

Example 3

A textile printing powder containing antipyrine and the disodium salt of the acid sulfuric acid ester of the leuco compound of chlorinated iso-dibenzanthrone (mixture of di- and trichloro-iso-benzanthrones) is prepared by intimately mixing:

100 parts of a dry dyestuff composition containing the disodium salt of the acid sulfuric acid ester of the leuco form of the above chlorinated iso-dibenzanthrone (equivalent to 43.2 parts of the parent vat dyestuffs) with
44.6 parts of antipyrine.

When this dyestuff composition is used in printing paste formulation for use in cotton printing, prints are obtained which are very much stronger and brighter than those obtained from a printing paste in which the dyestuff composition does not contain the antipyrine but instead is standardized to the equivalent strength by the use of a diluent, for example, glucose.

Example 4

A powder which is excellently suitable for cotton printing is prepared by adding:

195 parts of a wet filter cake containing the disodium salt of the acid sulfuric acid ester of the leuco form of the parent dyestuff described in Example 3 (equivalent to 37.3 parts of the parent vat dyestuff) to a solution prepared by dissolving
38.3 parts antipyrine
15 parts corn syrup
3 parts soda ash in
500 parts of water.

The liquid mass is stirred well and dried. The dried product, which contains approximately 124.3 parts of a dyestuff composition which corresponds to a 30% concentration of the parent vat dyestuff, is ground and converted to a print paste by the usual method. Cotton prints are obtained which are stronger and brighter than those obtained from a print paste made from the like dyestuff composition prepared in the same way but without the antipyrine.

Example 5

A textile printing powder is prepared as in Example 1 but containing 35 parts of 1-phenyl-3-methyl-5-pyrazolone in place of the antipyrine. Used in the formulation of a printing paste as in the previous examples, cotton prints are obtained which are stronger than similar prints obtained in the absence of the pyrazolone.

Example 6

A textile printing powder containing amino antipyrine and the tetra sodium salt of the acid sulfuric acid ester of the leuco form of 2,1,5,4-anthraquinone-di-phenylthiazole is prepared by intimately grinding together in the dry form:

100 parts of the dry composition containing the tetra sodium salt of the acid sulfuric acid ester of the leuco form of 2,1,5,4-anthraquinone-di-phenylthiazole (equivalent to 43 parts of the parent vat dyestuff) with
72 parts of amino-antipyrine.

This powder is used to prepare a printing paste which yields cotton prints that are very much stronger and brighter than prints similarly obtained from the corresponding printing paste not containing the pyrazolone but in place thereof a non-electrolyte or diluent such as dextrose.

Example 7

A dry dyestuff composition is prepared by intimately grinding together in the dry state:

100 parts of the tetra sodium salt of the acid sulfuric acid ester of the leuco form of the parent vat dyestuff described in Example 6 (equivalent to 42.7 parts of the parent vat dyestuff) with
17 parts dextrose and
54 parts of antipyrine.

A printing paste is made using this dry dyestuff composition as follows:

4 parts of the dry dyestuff composition is mixed with
4 parts $\beta,\beta'$-dihydroxy diethylsulfide and
4 parts urea.

This mixture is dissolved in 30 parts warm water. There is now added:

50 parts of a starch-tragacanth thickening, followed by
8 parts of a 20% sodium chromate solution.

A like dry dyestuff composition is prepared using the diluent, dextrose, in place of the antipyrine. A print paste similar to the one described in the foregoing is made up from this dyestuff composition.

Cotton cloth is printed with a portion of each of the printing pastes as thus prepared. After drying, the printed cloth is subjected to acid fume ageing in the vapor obtained by boiling an aqueous mixture of acetic and formic acids. The cotton cloth is rinsed, soaped and finished in the usual manner.

The printing paste containing antipyrine yields prints that are stronger and brighter than the prints obtained from the printing paste without antipyrine.

Another portion of each of the printing pastes is permitted to stand 7 days. The print paste containing the antipyrine shows only a slight precipitate after 7 days' standing whereas the print paste made without antipyrine shows a very heavy precipitate almost immediately after original make up of the paste formulation.

I claim:

1. A dyestuff composition comprising a salt of an acid polybasic acid ester of a leuco vat dyestuff, and a basic pyrazolone compound.
2. A dyestuff composition comprising a salt of an acid sulfuric acid ester of a leuco vat dyestuff, and a basic pyrazolone compound.
3. A dyestuff composition comprising a salt of an acid sulfuric acid ester of a leuco vat dyestuff, and a basic pyrazolone compound which contains the antipyrine nucleus.
4. A dyestuff composition comprising a salt of an acid sulfuric acid ester of a leuco vat dyestuff, and antipyrine.
5. A dyestuff composition comprising a salt of an acid sulfuric acid ester of a leuco vat dyestuff, and amino-antipyrine.
6. A dyestuff composition comprising a salt of an acid sulfuric acid ester of a leuco vat dyestuff, and dimethylamino-antipyrine.

JOHN TARAS.

REFERENCES CITED

The following references are of record in the file of this patent:

UNITED STATES PATENTS

| Number | Name | Date |
|---|---|---|
| 2,029,351 | Wormald | Feb. 4, 1936 |
| 2,302,753 | Dupont | Nov. 24, 1942 |
| 2,431,708 | Ratti | Dec. 2, 1947 |
| 2,432,041 | Ratti | Dec. 2, 1947 |